United States Patent [19]

Sieve

[11] 4,328,649
[45] May 11, 1982

[54] DEVICE FOR MOUNTING PLASTIC SHEETS

[75] Inventor: Gregor Sieve, Lohne, Fed. Rep. of Germany

[73] Assignee: Gebr. Pöppelmann, Inhabber Josef Pöppelmann, Lohne, Fed. Rep. of Germany

[21] Appl. No.: 121,496

[22] Filed: Feb. 14, 1980

[30] Foreign Application Priority Data

Aug. 30, 1979 [DE] Fed. Rep. of Germany ....... 2935059
Oct. 26, 1979 [DE] Fed. Rep. of Germany ... 7930367[U]

[51] Int. Cl.$^3$ .............................................. E06B 3/26
[52] U.S. Cl. ...................................... 52/202; 52/222
[58] Field of Search ................ 52/202, 203, 222, 273, 52/63; 24/211 R, 230 R, 230 AK, 230 AL, 245 R, 247

[56] References Cited

U.S. PATENT DOCUMENTS

| | | | |
|---|---|---|---|
| 2,837,804 | 6/1958 | Danell | 24/247 X |
| 2,939,195 | 6/1960 | Carlson | 24/245 R |
| 3,238,835 | 3/1966 | Rosenberg | 52/404 X |
| 3,913,186 | 10/1975 | Ray et al. | 24/247 X |
| 4,174,596 | 11/1979 | Deibele | 52/202 |

Primary Examiner—Price C. Faw, Jr.
Assistant Examiner—Carl D. Friedman
Attorney, Agent, or Firm—Bernard, Rothwell & Brown

[57] ABSTRACT

Device for mounting plastic sheets on roofs or walls of greenhouses or other heated buildings with large window areas. A mounting flange is pasted or screwed to the pane or sash. The mounting flange includes a projection having a head with an inclined face facing the base of the mounting flange. A clamping member including a wedge-shaped base having an aperture therein is placed over the projection. As the clamping member is moved parallel to the mounting flange, shoulders on the clamping member adjacent the aperture engage the inclined face of the projection head to press the plastic sheet firmly between the clamping member and the mounting flange. Resilient tongues are provided on the clamping member to prevent accidental removal of the clamping member. Provision is made for placing a wire through a plurality of these devices to further hold the plastic sheet in position.

19 Claims, 19 Drawing Figures

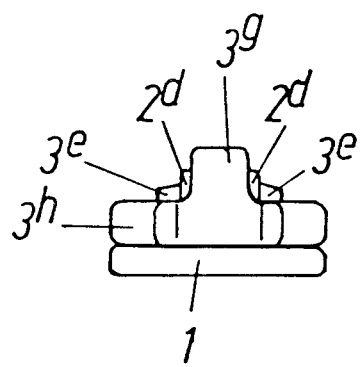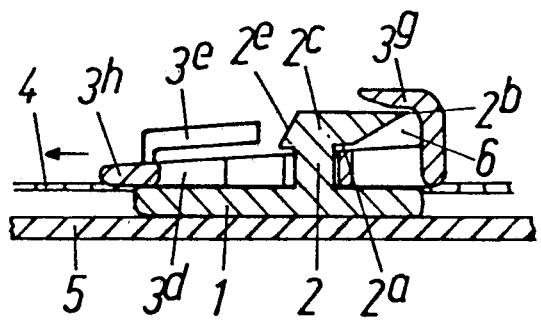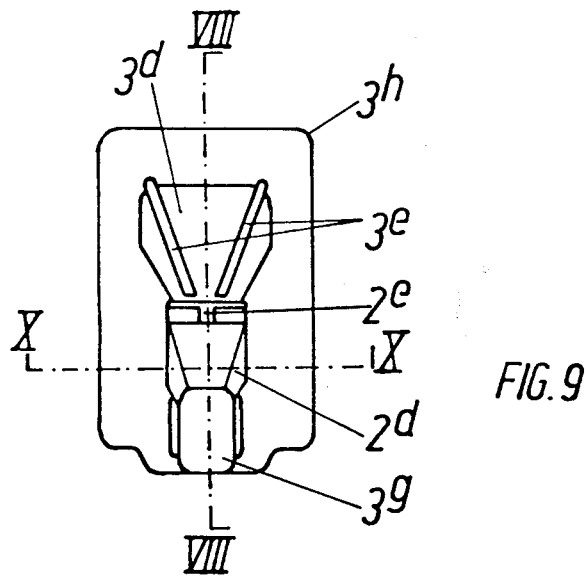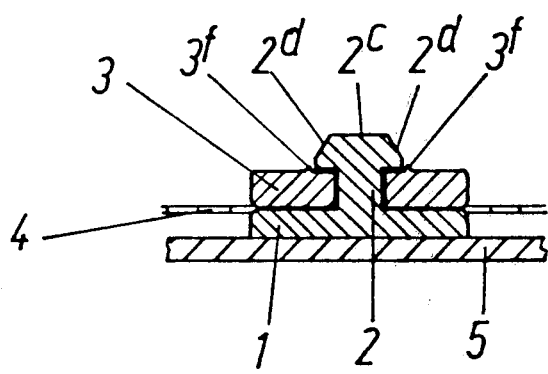

DEVICE FOR MOUNTING PLASTIC SHEETS

BACKGROUND OF THE INVENTION

The invention relates to a device for mounting plastic sheets, especially plastic nap sheets, on panes, sashes and so on, of walls, roofs, etc. of greenhouses or other heated buildings with large windowpanes.

In connection with the heating of greenhouses the use of nap sheets for heat insulation is becoming increasingly important for saving energy. Generally, nap sheets consist of three superposed plastic films, the intermediate of which is fixed partly to the bottom film and partly to the top film so that small, substantially closed, air-filled flat cushions are formed between the films. Therefore, these nap sheets have a high thermal insulating property and are used for the temporary heat insulation of greenhouses, as well as other insulation purposes. Until now, the sheets have mostly been fastened on the inside of the greenhouse wall or roof by means of holders which are pasted on the pane or screwed onto the aluminum sashes supporting the panes. The attachment of nap sheets to the inside of the wall or roof usually results in a difficult and tedious mounting procedure because of shelves, heating pipes, etc. located inside the greenhouse. Moreover, it is difficult to seal leaks by covering the walls with sheets from the inside. Additional time is wasted by the need to repeatedly remove and remount the sheets, e.g., in spring and in autumn.

Known devices for mounting nap sheets are designed in such a manner that the nap sheet is fastened by putting it on a holder and screwing a cap on the holder. These devices are not suitable for mounting sheets on the outside of greenhouses because the sheets easily tear out by the action of wind and consequently detach from the mounting device. The outdoor fastening is, however, desired because of improved insulation and the easier mounting of the sheets.

An object of the present invention is to provide a device for mounting plastic sheets, especially plastic nap sheets, on glass panes and/or sashes which form portions of walls, roofs, etc. of buildings, such as greenhouses with large glass panes.

A further object of the invention is to provide a device for the outdoor mounting of plastic nap sheets on panes and/or sashes which resists strong wind action and prevents tearing out of the sheet at the fastening points.

A further object is to provide a device for mounting nap sheets at pane walls and/or pane roofs which avoids twisting of the sheet at the mounting point such as occurs with the known screw devices when screwing on the cap. This twisting causes an undesirable stress of the plastic sheet material which facilitates tearing out under wind pressure.

A further object of the invention is to provide a device for fastening nap sheets at panes and/or sashes which facilitates the rapid mounting and demounting of the sheets and allows quick accommodation of the thermal insulation to the weather conditions.

SUMMARY OF THE INVENTION

The invention relates to a device for mounting plastic sheets, especially plastic nap sheets, at panes and/or sashes of walls, roofs, etc. of houses with large windowpanes, especially on a pane or its supporting frame. In particular, the invention relates to a mounting flange provided with a projection adapted to pierce the sheet, and a clamping member adapted to be inserted between the projection and the flange, whereby the pierced sheet is pressed against said flange.

According to the invention this device is characterized in that the projection comprises at least one, and preferably two, faces facing the flange, and the clamping member is formed as a slide having at least one, and preferably two, shoulders, the faces being inclined to the flange and/or the slide shoulders being wedge-shaped. Preferably, the two faces of the projection are located at the bottom of the projection head on both of its sides, and each of the faces is adapted to cooperate with the respective shoulder of the clamping member.

The mounting flange of the holder is pasted on the pane of the greenhouse wall by means of a special adhesive, or is screwed onto the supporting frame of the glass wall. In order to mount the sheet, the latter is pierced by the projection of the holder. Then the slide is pushed with its shoulders between the flange and the faces of the projection. Because the faces which cooperate with the shoulders of the slide are inclined and/or the shoulders are wedge-shaped, pushing in the slide results in an increasing squeeze of the sheet between the flange of the holder and the slide approaching the flange. The slide is pushed in until a tight clamp fit is achieved, thereby pressing the sheet against the mounting flange. In this manner, mounting devices according to the invention are fastened to the walls at a distance of 2 to 3 meters from each other, and the nap sheet is mounted on these devices. The sheet mounting according to the invention not only avoids a twisting of the sheet around the mounting place due to the sheet being partially carried along with the screw cap, but also allows the application of fastening wires or cords extending in a longitudinal direction. The cooperation of the parts of the fastening means results in a mounting of the sheet which cannot tear out even under the action of a strong wind.

According to a preferred embodiment of the invention, the slide comprises an aperture to be passed through by the projection, the aperture having edge zones opposite to each other serving as shoulders, and the projection comprises a head with its bottom surface facing the flange and adapted to extend above said edge zones. The aperture in the slide can be an opening of such size and shape that the head of the projection can pass through. Subsequently, the slide can be displaced on the holder so that the shoulders or jaws are moved into the clearance between the flange and the bottom surface of the head, and finally grip under the head of the projection. Two edge zones parallel to each other at this aperture can serve as the jaws or shoulders, the distance of said edge zones from each other being so wide that, although the projection fits between the jaws, its head projects over the jaws so that the slide cannot be taken off from the holder when the projection is located between the jaws.

According to a preferred embodiment of the invention, at least one, and preferably two, resilient tongues formed on the upper side of the slide are adapted to be spread by the projection when it is passing through and moved into the clearance between the shoulders. These tongues spring back into their normal position within the path of movement when the projection has passed the tongues. The tongues projecting into said path of the projection movement prevent the slide from unintentially moving out of its slide-in position, e.g., by the action of wind, which might thereby release the jamming action by which the sheet is jammed between the holder and the slide.

Preferably, the slide has substantially the shape of a plate having its thickness increasing in the slide-in direction of the projection. With this embodiment, not only are the jaws wedge-shaped, but the whole slide is formed as a wedge-shaped plate. The aperture is an opening in the plate which is wider than the projection head so that the latter can pass through the opening. The aperture can also be a slit starting at the rim of the plate-shaped slide. At any rate, due to the inclination of the bottom side of the head to the flange and/or the wedge shape of the slide or its jaws, the distance between the slide and the mounting flange of the holder is necessarily diminished with increasing displacement of the head onto the jaws or shoulders, and in that manner the interposed sheet is jammed.

According to a preferred embodiment of the invention, the projection of the holder is formed as a pointed hook, the upper side of which can be preferably inclined to the flange. The pointed hook facilitates the piercing of the nap sheet. The hook shape of the projection allows one to suspend the whole sheet at the hooks and then to fasten the sheet by pushing the slides on their holders. The sloped upper side of the hook guarantees that the resilient tongues strike on the inclined areas of said upper side and thus are forced apart when the hook is put through the aperture of the slide.

According to a preferred embodiment of the invention, a bow flap formed on the slide extends at least partially over the projection, especially over its hook point, when the slide is pushed on the holder. In this manner, injuries caused by the exposed point are avoided. Moreover, with the slide in the pushed-in position, a wire, cord, or the like can be passed through between the flap and the projection head. This wire or cord can be passed through a plurality of mounting devices of the invention in the same manner and subsequently strained. By this means, the nap sheet may be held down by the stretched wires in addition to the puncturing mounting devices, so that the movability of the sheet normal to the panes is extremely small, even between the mounting devices.

The inclination of the faces of the projection towards the flange and/or the wedge angle of the shoulders of the slide can be in the range from 2° to 20°, preferably from about 4° to 5°. The small slope assures a flat fastening of the sheet between the slide and the flange when pushing the slide jaws between the head and the mounting flange of the holder, so that the sheet cannot tear out even with strong wind pressure, and the slide cannot remove itself from its jammed position. The holder is advantageously fastened in such a manner at the pane or its supporting frame that the point of the hook is upwardly directed, and the slide has to be pushed into the holder in a downward direction; the slide can therefore be removed from the holder only in an upward direction against gravity.

A rib can be provided on the upper side of the slide, on each side of the head when it is located in the inserted position between the shoulders or jaws. These ribs serve as lateral guidance for the slide during the slide-in, and prevent the slide from turning on the holder.

In another embodiment the slide is bow-shaped, with said wedge-shaped shoulders being formed at the ends of the bow. These shoulders are adapted to grip below the inclined faces of the projection in such a manner that the sheet is jammed between the mounting flange of the holder and the shoulders.

With this embodiment, the slide is provided with at least one bore which abuts on the projection during the slide-in movement and is located beside, and preferably below, the projection when the slide is in its final slide-in position. After the slides are pushed into their holders, wires can be strung through the bores of a row of these devices. As the wires are movably received in the bores, they can be subsequently strained. By means of such a straining of wires, the nap sheet is held down by the stretched wires, combined with the mounting devices, so that the movability of the sheet in a direction vertical to the pane wall is extremely small, even between the mounting devices of the invention. With the wires strung, the slides are safety-wired in their holders and cannot be released without the strung wires being previously removed. Conveniently, the bore extends in a direction perpendicular to the slide-in direction of the slide, and preferably in a horizontal direction, allowing convenient horizontal stringing of the wires.

Preferably, a laterally projecting clip is formed at the slide. These clips are adapted to an additional vertical fastening means, e.g., aluminum tubes or rods. By these fastening means, extending vertically at the wall, the sheet is pressed against the wall near the ground, even if mounting devices can no longer be fastened because of poor adhesion in that zone (concrete or brickwork foundation; rising wetness). Conveniently, the clip is formed laterally at the slide in such a manner that the clamped tube has the smallest possible distance from the nap sheet.

A further flange can be formed at the projection in a spaced relationship and parallel to said mounting flange, with the pushed-in slide pressing the nap sheet against this further flange. Conveniently, this embodiment is selected if the nap sheet should have a greater distance, e.g., 1 cm. or more, from the pane or the glass wall.

Moreover, the slide can additionally be provided with a through groove on its upper side. When the wires are strung, they can lie in these grooves so that their passing through the bores can be avoided.

BRIEF DESCRIPTION OF THE DRAWINGS

In order to enable the invention to be more readily understood, reference will now be made to the accompanying drawings which illustrate by way of examples two embodiments thereof, and in which:

FIG. 7 is a front view of the holder with the inserted slide;

FIG. 8 is a section along the line VIII—VIII of FIG. 9 with the nap sheet and pane shown;

FIG. 9 is a top plan view of the device of the preferred embodiment of the invention comprising the holder with the slide pushed in;

FIG. 10 is a sectional view along line X—X of FIG. 9 with the jammed nap sheet and the pane;

DESCRIPTION OF THE PREFERRED EMBODIMENTS

Figure 1:
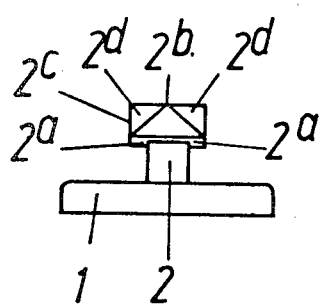
FIG. 1 is a front view of a holder of the preferred embodiment of the device of the invention.
Figure 2:
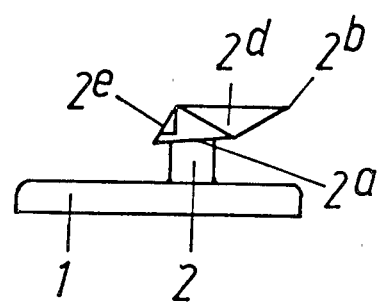
FIG. 2 is a side view of the holder of the preferred embodiment of the device of the invention.
Figure 3:
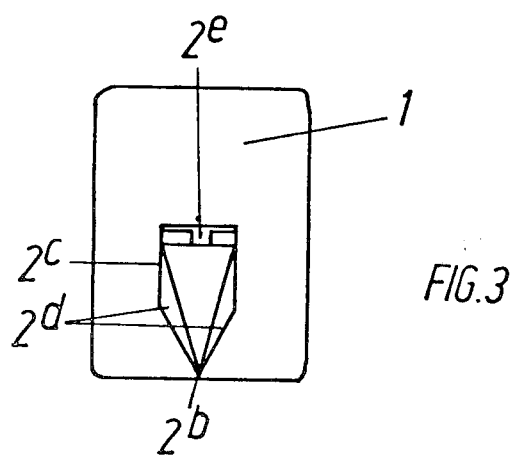
FIG. 3 is a top plan view of the holder of the preferred embodiment of the device of the invention.

A preferred embodiment of the mounting device of the invention is shown in FIGS. 1 to 10. According to FIGS. 1 to 3, the holder comprises a mounting flange 1, the bottom side of which can be pasted on a pane of a greenhouse. A projection 2 having a head $2^c$ is formed on the top side of the mounting flange 1. The head $2^c$ is formed as a pointed hook, tapers off in a point $2^b$ and comprises two faces $2^d$, each of which is sloped to a side, and a face $2^e$ sloped to the rear. The bottom side $2^a$ of the head $2^c$ is inclined to the mounting flange 1 at a small angle, e.g., 4.5°, as can clearly be seen from FIG. 2. FIG. 1 shows that this slightly inclined bottom side $2^a$ extends along both sides of the projection 2. The holder is pasted onto the pane in such a manner that the point $2^b$ is directed upwardly as far as possible. After the nap sheet has been pierced by means of the point $2^b$, the sheet can be suspended on the projection and fastened by pushing a clamping member in the form of a slide described below onto the holder.

Figure 4:
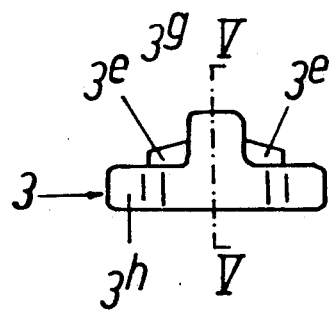
FIG. 4 is a front view of the slide of the preferred embodiment of the device of the invention.
Figure 5:
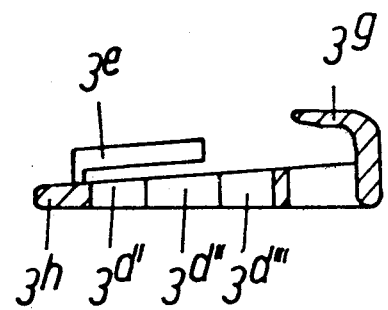
FIG. 5 is a longitudinal section along the line V—V of FIG. 4.
Figure 6:
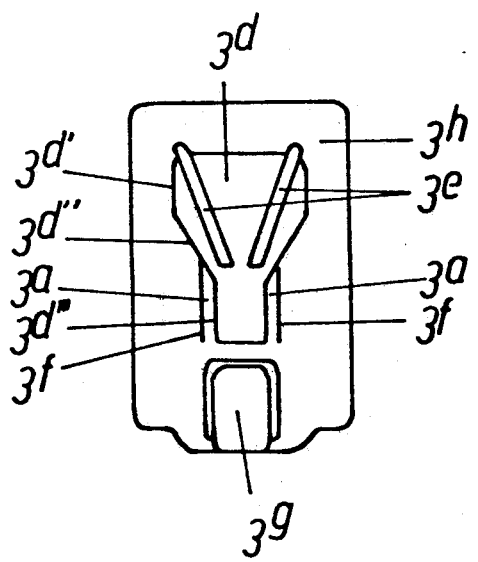
FIG. 6 is a top plan view of the slide of the preferred embodiment of the device of the invention.
Figure 11:
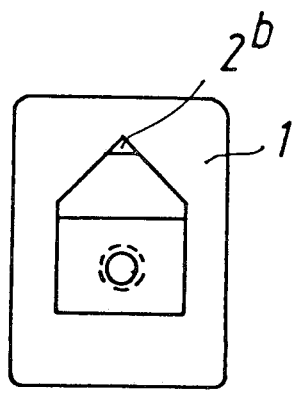
FIG. 11 is a top plan view of a holder of a second embodiment of the device of the invention.
Figure 12:
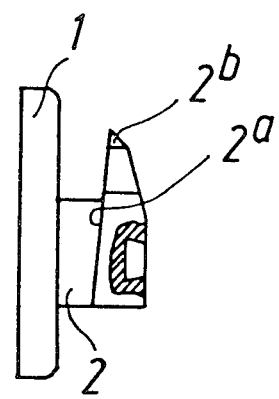
FIG. 12 is a side view of the holder of the second embodiment of the device of the invention.
Figure 13:
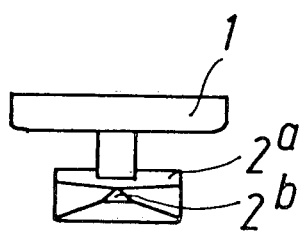
FIG. 13 is a front view of the holder of the second embodiment of the device of the invention.

The slide 3 shown in the FIGS. 4 to 6 substantially comprises a wedge-shaped plate member $3^h$ having an aperture $3^d$. The aperture $3^d$ comprises a wide zone $3^{d'}$, a zone $3^{d''}$ which necks in the slide-in direction, and a narrow zone $d^{d'''}$. Jaws or shoulders $3^a$ (FIG. 6) are located on both sides of the narrow zone $3^{d'''}$. The aperture zones $3^{d'}$ and $3^{d''}$ are dimensioned in such a manner that the head $2^c$ can pass through, whereas the narrow zone $3^{d'''}$ is dimensioned in such a manner that the projection shank bearing the head can pass through. Furthermore, two resilient tongues $3^e$ are formed on the top side of the wedge-shaped plate member $3^h$; these tongues project along the zones $3^{d'}$ and $3^{d''}$ of the aperture $3^d$. The purpose of these tongues is described below. Furthermore, a flap $3^g$ is formed at the thick end of the plate member and bent over the plate. The purpose of this flap is also explained below. Finally, ribs $3^f$ extending in the longitudinal direction of the plate member $3^h$ are formed on the top side of the plate member on both sides of narrow aperture zone $3^{d'''}$.

FIGS. 7 to 10 show a nap sheet jammed between the holder, pasted onto a glass wall 5, and the inserted slide 3. After the sheet has been pierced by means of point $2^b$ and the entire head $2^c$ has been pushed through the hole, the slide 3 is put on the holder in such a manner that the head $2^c$ passes through the aperture zones $3^{d'}$, $3^{d''}$. By this means the tongues $3^e$ strike on the inclined faces $2^d$ and are spread with their progressive passage, i.e., their free ends visible in FIG. 9 are moved from each other. When finally the slide plate $3^h$ lies on the nap sheet resting on the mounting flange 1, the slide 3 is displaced on the holder in the longitudinal direction so that the projection 2 is moved into the narrow aperture zone $3^{d'''}$. By this means the head $2^c$ is moved from the zone of the spread tongues $3^3$ in the direction to the bow flap $3^g$ so far that the point $2^b$ in its final position is located below the bow flap $3^g$, as shown in FIG. 8. Before having reached this final position, the head $2^c$ leaves the range of the tongues $3^e$, so that the tongues spring back behind the head into their normal position shown in FIG. 9 in which they stop the return motion of the head $2^c$ in the direction to the aperture zones $3^{d'}$, $3^{d''}$. Accordingly, the tongues $3^e$ prevent an unintentional and undesired displacement of the slide, e.g., caused by action of wind, and possibly a removal of the slide from the holder. In order to remove the sheet from the mounting device the tongues $3^e$ have to be spread either manually or by means of a tool, in such a manner that the slide can be again moved upwardly until the aperture zones $3^{d'}$, $3^{d''}$ lie below the head $2^c$. Now the slide and, accordingly, the sheet, can be removed from the holder. FIGS. 8 and 9 show that in the slide-in position, the point $2^b$ is protected by the flap $3^g$ so that there is no possiblity of injury.

Due to the wedge shape of the slide plate member $3^h$ and the inclination of the head bottom side $2^a$ with respect to flange 1, the slide-in movement of the slide in the direction of the arrow in FIG. 8 results in a forced decrease of the distance of the slide plate member $3^h$ from the mounting flange 1 and accordingly a jamming of the nap sheet 4 between the slide plate and the flange. In the final slide-in position shown in FIG. 8, a space 6 is formed between the head $2^c$, the bow flap $3^g$ and the slide plate $3^h$ through which loop a straining wire (not shown) can be drawn. If such a wire is strained through a plurality of mounting devices in this manner, an additional fastening of the sheet results from the strained wire. Finally, the ribs $3^f$ serve as guides for the head $2^c$ and help prevent the slide from turning on the sheet.

The embodiment of the device of the invention shown in the FIGS. 11 to 19 comprises a holder consisting substantially of a mounting flange 1 which is pasted with its bottom side onto the pane 5 of a greenhouse. On its top side, the mounting flange 1 has a hook-shaped projection 2 tapering off in a point $2^b$. The mounting flange 1 is pasted onto the pane 5 in such a manner that the point $2^b$ points upwardly in a direction as vertical as possible. As can be seen from FIGS. 12 and 13, the hook-shaped projection 2 comprises a face $2^a$ which is slightly sloped relative to the top side of flange 1 and which extends on both sides of the projection.

Figure 14:
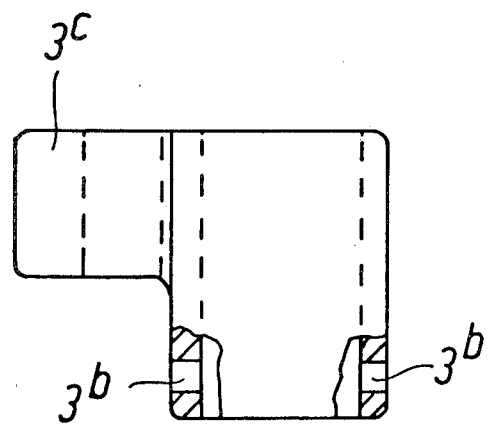
FIG. 14 is a partly sectional back view of the slide of the second embodiment of the device of the invention.
Figure 15:
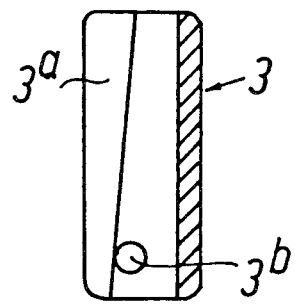
FIG. 15 is a partly sectional side view of the slide of the second embodiment of the device of the invention.
Figure 16:
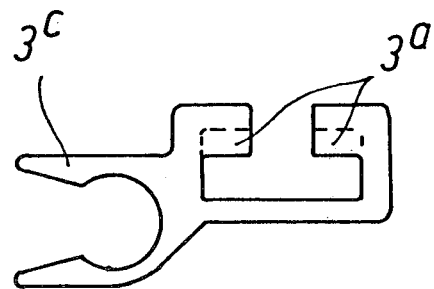
FIG. 16 is a top plan view of the slide of the second embodiment of the device of the invention.
Figure 17:
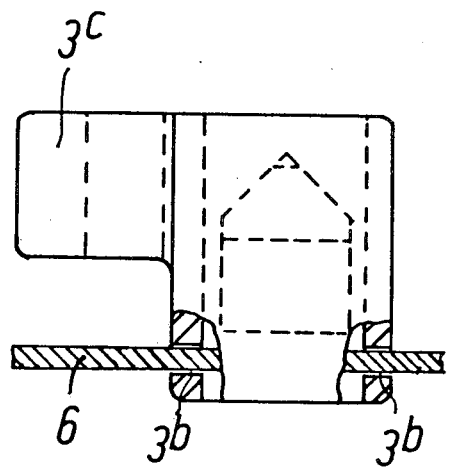
FIG. 17 is a partly sectional back view of the holder with the inserted slide of the second embodiment of the device of the invention.
Figure 18:
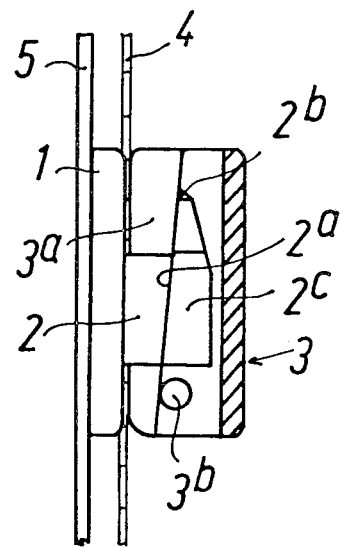
FIG. 18 is a side view of the holder with partly sectional pushed-in slide having a nap sheet jammed therebetween, of the second embodiment of the device of the invention mounted on a pane.

The slide 3 shown in the FIGS. 14 to 16 is bow-shaped and embraces the hook portion of the projection 2 and comprises two parallel wedge-shaped shoulders $3^q$ which are adapted to grip behind the projecting shoped faces $2^a$ of the projection 2. These shoulders lead to a clamp fit of the slide 3 on the hook-shaped projection 2 during the slide-in movement. The lower part of slide 3 contains two bores 3$^b$ which extend through its legs in a direction approximately perpendicular to the slide-in movement of the slide and which are in alignment with each other. As can be seen from FIG. 17 and 18, the bores 3$^b$ are located below the projection 2 when the slide is pushed onto the projection and is in its final slide-in position. After the sheet 4 has been fastened to the pane 5 by the mounting devices a wire 6 can be drawn through the bores 3$^b$ of a plurality of mounting devices fastened substantially at the same horizontal height, and strained. In this manner the sheet mounting is improved, and the movability of the sheet between the mounting devices is further restricted. Further, because of the position of the bore relative to the projection in the assembled position of the mounting devices, once the wire has been installed and strained, the slide cannot be released without first removing the wire. Alternatively, in lieu of the bores 3$^b$ a groove may be provided in the upper side of the slide and the wires can be placed in these grooves so that the effort of feeding the wires through the bores can be avoided.

Figure 19:
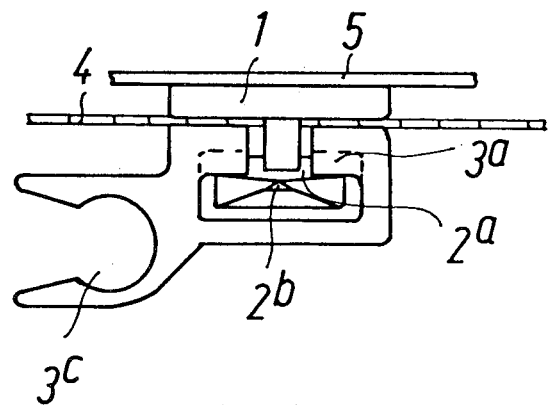
FIG. 19 is a top plan view of the second embodiment of the device of the invention with the jammed sheet.

As can be seen from FIGS. 16 and 19, the slide 3 includes a laterally extending clip 3$^c$, between the resilient legs of which a rod or tube (now shown) can be clamped.

These clips are aligned vertically and are adapted to provide an additional vertical fastening means for the sheet 4 by means of a rod or tube, preferably of aluminum, received therein. By these fastening means extending vertically along a side wall of the greenhouse or other structure, the sheet 4 is pressed firmly against the wall even near the ground where it may be difficult to secure the mounting devices because of poor adhesion in that region. Such poor adhesion may occur because of the presence of a concrete or brick foundation and moisture from the ground which may rise into the foundation. The clip is formed so that the clamped rod or tube is spaced the smallest possible distance from the sheet 4.

The mounting devices according to the invention allow a safe and gentle attachment of the nap sheet to glass walls and roofs of greenhouses and other buildings with large glass panes. They are particularly adapted for use with an outdoor sheet covering, since no wind pressure can become active between glass wall 5 and sheet 4 and consequently tearing out of the sheet at the devices is avoided even with strong wind action. The mounting device can easily be released so that the sheets can quickly be mounted and removed corresponding to the conditions of the outdoor temperature.

The holder and the slide can be made of plastics, e.g., by injection molding. When the holder is pasted on the pane, it preferably is made of a transparent plastic. Alternatively, as indicated earlier, where the holder is to be mounted on a metal sash, screw holes may be provided in the holder and screws may be employed to mount the holder.

It is claimed:

1. A device for mounting sheets on glass walls or roofs of greenhouses or other buildings comprising:
   (a) a holder adapted to be mounted on a pane or its supporting frame;
   (b) said holder comprising a mounting flange and a projection having a head spaced from said flange and adapted to pierce the sheet, and
   (c) a clamping member arranged for sliding movement transversely of said projection between said projection head and said flange;
   (d) said projection head including at least one face facing the flange;
   (e) said clamping member being formed as a slide having at least one shoulder;
   (f) said face or said shoulder being inclined so that sliding movement of said clamping member causes the pierced sheet to be pressed against said flange.

2. The device of claim 1, wherein the slide comprises an aperture through which said projection head may pass, said aperture has sides opposite to each other serving as said shoulders, and the projection head extends above said shoulders.

3. The device of claim 2, wherein the slide after the projection is passed through said aperture is arranged to be moved transversely of said projection to move said shoulders transversely into the clearance between said flange and said faces of said head.

4. The device of claim 2, wherein at least one resilient tongue formed at the upper side of the slide is arranged to be moved by the projection when it is passing through said aperture and to spring back into its normal position in the path of movement when the projection has passed said tongue.

5. The device of claim 2, wherein said faces are located on both sides of the bottom of said projection head, and each of said faces is arranged to cooperate with the respective shoulder of said clamping member.

6. The device of claim 2, wherein said slide includes a rib on the upper side thereof on each side of said aperture.

7. The device of claim 6, wherein the bore extends approximately perpendicularly to the slide-in direction of said slide.

8. The device of claim 1, wherein the slide has substantially the shape of a plate having a thickness increasing in the slide-in direction of the projection.

9. The device of claim 1, wherein the projection head is formed as a pointed hook the upper side of which is inclined to said flange.

10. The device of claim 1, wherein said slide includes a bow flap extending at least partially over the projection, when the slide is pushed on the holder.

11. The device of claim 1, wherein the inclination of said faces relative to said flange is in the range from 2° to 20°.

12. The device of claim 1, wherein the inclination of said faces relative to said flange is in the range from about 4° to 5°.

13. The device of claim 1, wherein said clamping member includes a wedge-shaped plate having a wedge angle in the range from 2° to 20°.

14. The device of claim 1, wherein said clamping member includes a wedge-shaped plate having a wedge angle in the range from about 4° to 5°.

15. The device of claim 1, wherein said projection head includes two inclined faces and said faces are formed at opposite sides of said projection head.

16. The device of claim 1, wherein said slide is bow-shaped and said shoulders are wedge-shaped and are formed at the ends of the bow, said faces are inclined, and said shoulders are urged against said inclined faces of the projection head so that the sheet is pressed between said slide and said flange.

17. The device of claim 1, wherein said slide is provided with at least one bore which is located beyond said projection when said slide is in its final slide-in position.

18. The device of claim 1, wherein said slide includes a laterally extending clip for receiving a rod or tube to hold the sheet against a wall.

19. The device of claim 1, wherein a further flange is formed at said projection in a spaced relationship and parallel to said mounting flange.

* * * * *